No. 12,738. REISSUED JAN. 14, 1908.

B. HANSON.

ENGINE VALVE.

APPLICATION FILED NOV. 18, 1907.

2 SHEETS—SHEET 1.

WITNESSES

John A. Burgess

Geo. H. Hooker

INVENTOR

Bernard Hanson

BY Munn & Co.

ATTORNEYS

No. 12,738.

REISSUED JAN. 14, 1908.

B. HANSON.

ENGINE VALVE.

APPLICATION FILED NOV. 18, 1907.

2 SHEETS—SHEET 2.

WITNESSES

John A. Stuart

Geo. J. Porter

INVENTOR

Bernard Hanson

BY Munn & Co.

ATTORNEYS

UNITED STATES PATENT OFFICE.

BERNARD HANSON, OF SCHROYER, KANSAS.

ENGINE-VALVE.

No. 12,738. Specification of Reissued Letters Patent. Reissued Jan. 14, 1908.

Original No. 854,036, dated May 21, 1907, Serial No. 338,733. Application for reissue filed November 18, 1907. Serial No. 402,750.

*To all whom it may concern:*

Be it known that I, BERNARD HANSON, a citizen of the United States, residing at Schroyer, in the county of Marshall and State of Kansas, have invented certain new and useful Improvements in Engine-Valves; and I do hereby declare the following to be a full, clear, and exact description of the invention, such as will enable others skilled in the art to which it appertains to make and use the same.

This invention relates to valves, and more particularly to those for steam engines, and has for its object, to provide a valve of oscillatory type, which may be easily applied to an engine and which may be operated to admit steam to the valve ports of the cylinder alternately.

Other objects and advantages will be apparent from the following description, and it will be understood that changes in the specific structure shown and described may be made without departing from the spirit of the invention.

Figure 1:
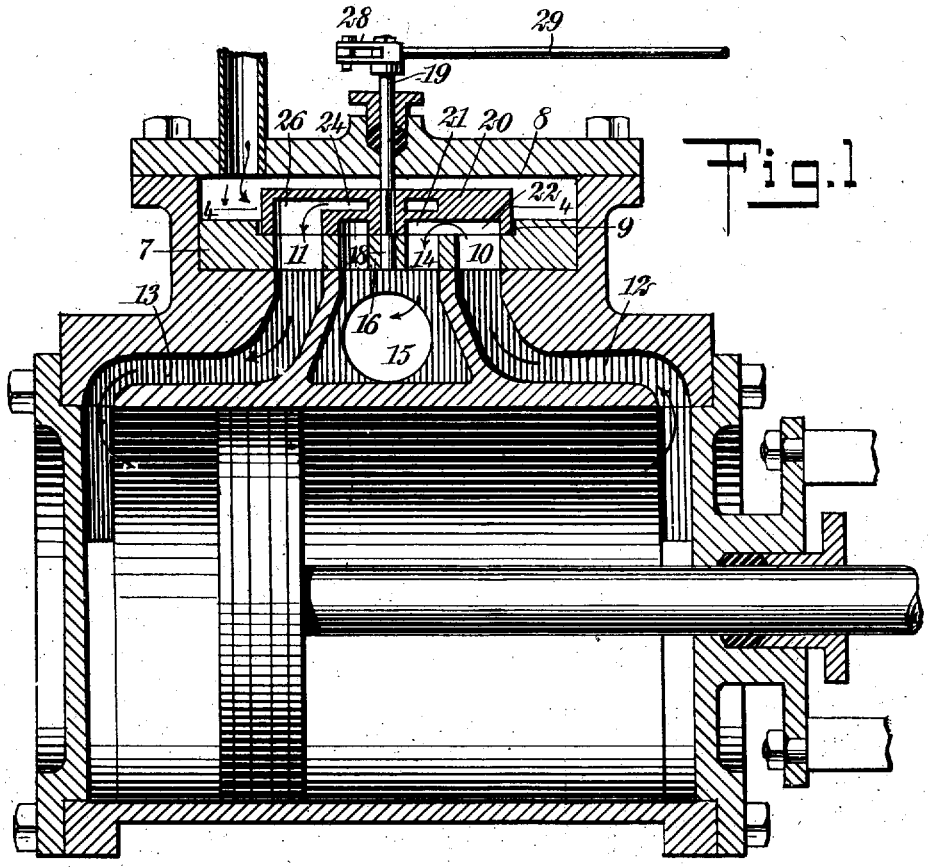
Figure 2:
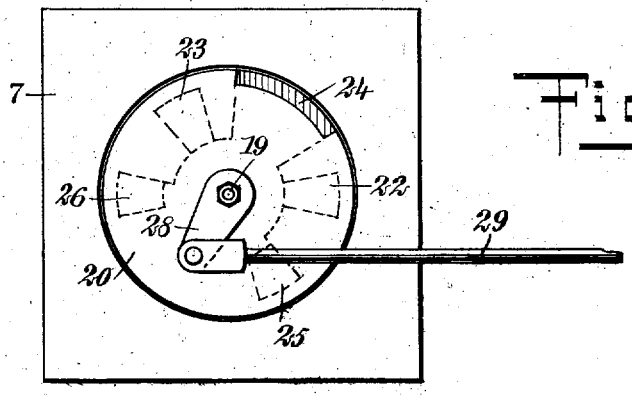
Figure 3:
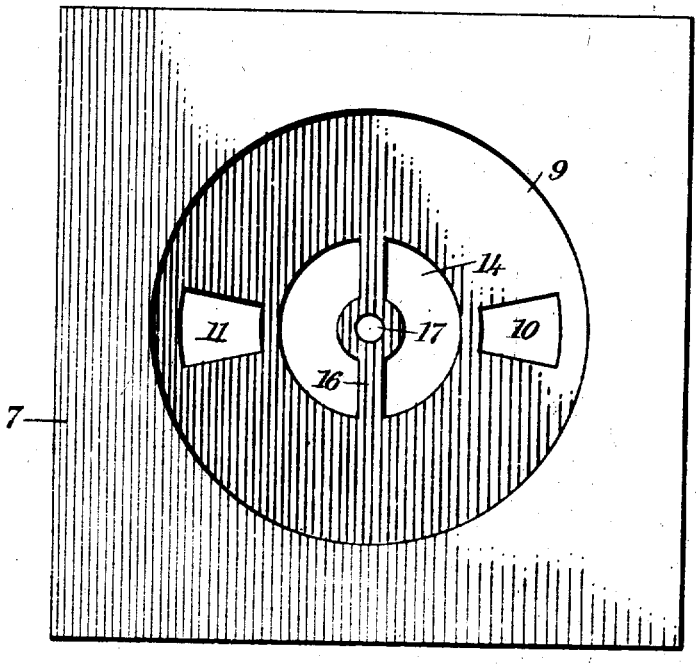
Figure 4:
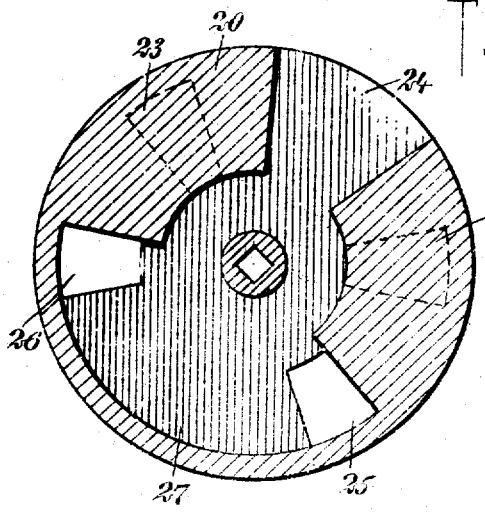
Figure 5:
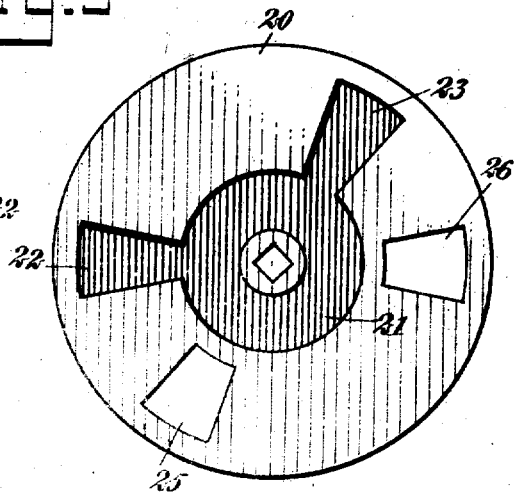

In the drawings forming a part of this specification, and in which like numerals of reference indicate similar parts in the several views, Figure 1 is a longitudinal section of an engine cylinder provided with the present invention; Fig. 2 is a plan view of the block and the valve mounted to oscillate thereon; Fig. 3 is an enlarged plan view of the block; Fig. 4 is an enlarged sectional plan view of the oscillating valve, the section being on the line 4—4 of Fig. 1, and Fig. 5 is an inverted plan view of the oscillating valve.

Referring now to the drawings, the present invention comprises a rectangular block 7, which is disposed within the steam chest 8 of the engine, this block being removable, as will be readily understood, and having in its upper surface a depressed circular valve seat 9, diametrically opposite ports 10 and 11 being formed through the bottom of this valve seat, and adapted to register with the ports 12 and 13, respectively, of the cylinder.

A central opening 14 is formed through the bottom of the valve seat 9 registering with the exhaust port 15 of the cylinder, and having a horizontal web 16 extending diametrically there-across. This web has a central socket 17 which receives the lower end 18 of vertical stem 19, this stem being revoluble in the socket, and having mounted thereupon a horizontally disposed disk valve 20, seated on the valve seat 9, and which has a central recess 21 in its under surface registering at all times with the opening 14. Recesses 22 and 23 are also formed in the under surface of the valve 20 outwardly of the recess 21 and communicating therewith, and these recesses 22 and 23 lie in circumferential alinement but out of diametrical alinement, and their positions are such that when the valve 20 is oscillated the recesses 22 and 23 move alternately into register with the ports 10 and 11, the recess 22 lying in registration with the port 10 when the recess 23 is out of registration with the port 11 and vice versa.

A transverse passage 24 is formed in the valve 20, opening at one end through the periphery of the valve, and ports 25 and 26, respectively, open through the under surface of the disk valve and are connected with the transverse passage 24 by the circumferential extension 27 of the passage 24, and the ports 25 and 26 lie in transverse alinement diametrically of the valve with the recesses 23 and 22, respectively.

It will thus be apparent that when the recess 22 is in registration with the port 10, the port 26 will be in registration with the port 11, and thus steam from the steam chest 8 will be free to pass through the passage 24 and its extension 27 to the port 26 and thence through the ports 11 and 13 into one end of the cylinder, the exhaust or dead steam passing out through the ports 12 and 10 to the recess 22 and thence to the recess 21, from which the exhaust steam passes through the opening 14 to the exhaust port 15. Oscillation of the valve 20 shifts the registering ports and passages, as will be readily understood, to admit steam to the opposite end of the cylinder. The stem 19 extends upwardly through the top of the chest 8, and is provided at its outer end with an arm 28 connected by a rod 29 with other mechanism for imparting the desired oscillating motion to the valve 20.

Having thus described my invention, I claim as new and desire to secure by Letters Patent:

1. The combination with an engine cylinder having a steam chest thereupon and having spaced ports communicating with the interior of the steam chest and an intermediate exhaust port, of a block removably disposed within the steam chest and having ports registering with the steam ports of the cylinder and an intermediate opening registering at all times with the exhaust port of the chest, and a passaged valve mounted to oscillate on the said block and arranged to establish communication between the ports of the block and the intermediate opening, and to establish communication between the ports and the interior of the steam chest alternately.

2. The combination with an engine cylinder having a steam chest thereupon and having spaced ports communicating with the interior of the steam chest and an intermediate exhaust port, of a block removably disposed within the steam chest and having ports registering with the steam ports of the cylinder and an intermediate opening registering at all times with the exhaust port of the chest, and a passaged valve mounted to oscillate on the said block and having in its under side a central recess and radial recesses leading to the said central recess, the latter being at all times in register with the said intermediate opening, and the said radial recesses being adapted to register alternately with the ports in the said block, the said valve having a transverse passage and ports leading thereto from the under side of the valve, the said transverse passage opening at one end into the steam chest, and the said valve ports being adapted to register alternately with the said block ports.

3. The combination with an engine cylinder having a steam chest thereupon and having spaced ports communicating with the interior of the steam chest, and an intermediate exhaust port, of a block removably disposed within the steam chest and having ports registering with the steam ports of the cylinder and an intermediate opening registering with the exhaust port of the chest, a web extending across the intermediate opening, a stem journaled in the web, and a passaged valve mounted upon the stem, said valve being arranged for movement, to establish communication between the ports of the block and the intermediate opening and to establish communication between the ports and the interior of the steam chest alternately.

4. A valve mechanism for engines, comprising a block having spaced ports therein and an intermediate opening, a web extending transversely of the opening, a stem journaled in the web, and a disk mounted upon the stem for movement therewith, said disk having a recess in its under face communicating with the intermediate opening of the block, and having a pair of recesses in its under surface outwardly of the central recess and communicating therewith, said disk having a pair of passages, one diametrically opposite each of the second-named recesses and having a third passage communicating with the first-named passages and with a surface of the disk other than the under surface thereof, said disk being movable to bring its first-named passages and corresponding recesses into registration with the ports of the block alternately.

In testimony whereof I have signed my name to this specification in the presence of two subscribing witnesses.

BERNARD HANSON.

Witnesses:
GEO. P. SCHMIDT,
C. J. S. KOESTER.